(12) United States Patent
Chan et al.

(10) Patent No.: US 6,910,028 B2
(45) Date of Patent: Jun. 21, 2005

(54) CONFLICT-HANDLING ASSIMILATOR SERVICE FOR EXCHANGE OF RULES WITH MERGING

(75) Inventors: Hoi Yeung Chan, Stamford, CT (US); Benjamin N. Grosof, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 09/916,943

(22) Filed: Jul. 27, 2001

(65) Prior Publication Data

US 2003/0023573 A1 Jan. 30, 2003

(51) Int. Cl.[7] ............................................... G06N 5/02
(52) U.S. Cl. ............................. 706/47; 706/14; 706/12
(58) Field of Search ............................. 706/47, 14, 12

(56) References Cited

U.S. PATENT DOCUMENTS

| | | | |
|---|---|---|---|
| 6,640,244 B1 | * 10/2003 | Bowman-Amuah | 709/207 |
| 6,643,652 B2 | * 11/2003 | Helgeson et al. | 707/10 |
| 2002/0073080 A1 | * 6/2002 | Lipkin | 707/3 |
| 2002/0073236 A1 | * 6/2002 | Helgeson et al. | 709/246 |
| 2002/0107861 A1 | * 8/2002 | Clendinning et al. | 707/101 |

OTHER PUBLICATIONS

Francis S. Dworak, Approaches to detecting and resolving feature interactions, 1991, IEEE, CH2980–1/91/0000–1371, 1371–1377.*

"IBM Research Report—Courteous Logic Programs: Prioritized Conflict Handing for Rules", by Benjamin N. Grosof, IBM Research Division, RC 20836 (92273), May 8, 1997, revised Dec. 30, 1997, Computer Science, pp. 1–57.

"IBM Research Report—DIPLOMAT: Compiling Prioritized Default Rules into Ordinary Logic Programs, for E–Commerce Applications (extended abstract of Intelligent Systems Demonstration)", by Benjamin N. Grosof, IBM Research Division, RC 21473 (96901), May 7, 1999, pp. 1–15.

A Courteous Compiler From Generalized Courteous Logic Programs to Ordinary Logic Programs (Preliminary Report), by Benjamin N. Grosof, Supplementary Update Follow–On to IBM Research Report RC 21472, IBM Research Division, Version of Jul. 20, 1999, pp. 1–12.

"IBM Research Report—Compiling Prioritized Default Rules into Ordinary Logic Program", by Benjamin N. Grosof, IBM Research Division, RC 21472 (96900), May 7, 1999, Computer Science, pp. 1–17.

\* cited by examiner

*Primary Examiner*—Joseph P. Hirl
(74) *Attorney, Agent, or Firm*—Scully, Scott, Murphy & Presser; Richard Lau, Esq.

(57) ABSTRACT

A system and method for merging two rulesets provided in rule-based systems associated with originating applications executing at different locations, each ruleset comprising rules in potential conflict with each other, and each ruleset being in a different rule format. The rulesets to be merged are communicated to an assimilator service provided with a merge policy comprising a set of specifications of partially-ordered priorities and/or mutual-exclusion constraints. The rulesets are translated into a common core representation capable of being implemented in any logic program rule engine provided in a rule-based application at any location. The rulesets are assimilated to produce a new merged ruleset comprising logic required for resolving potential conflicts among rules in accordance with the merge policy that is implemented in any logic program rule engine provided at any location. The new merged ruleset is then translated into one of the originating application's rule format.

18 Claims, 3 Drawing Sheets

Assimilator Service

CONFLICT-HANDLING ASSIMILATOR SERVICE FOR EXCHANGE OF RULES WITH MERGING

BACKGROUND OF THE INVENTION

1. Field of the Invention

This invention relates generally to rule-based systems for representing knowledge, and more specifically, to a novel conflict handling and assimilator mechanism for enabling the exchange or merger of rules with different format and, resolving conflicts among the merged rules.

2. Discussion of the Prior Art

Rule based systems, a form of knowledge based systems, originate from the context of Artificial Intelligence. The simplest, most widely used form of artificial intelligence technologies is the rule-based system, also known as expert system. Rule based systems are built using rules in the form of if/then patterns. A rule-based system is a way of encoding the knowledge of a human expert in a relatively narrow area of a system. Typically, it separates the logic (represented by rules) from the data (represented by facts or assertions). The advantages of such a system is that the knowledge of the human expert becomes comprehensible to a wide variety of people other than the software engineers who encode the knowledge. Another advantage is the ease of maintenance and modification, i.e., rules may be added/deleted/modified without going through the complete cycle of compile/test.

In all rule-based systems, each "if" pattern (conventionally referred to as an antecedent) is a pattern that may match one or more of the assertions in a collection of assertions. The collection of facts/assertions is sometimes referred to as the working memory. It is understood that the working memory can further be divided into short term facts or long term facts. The "then" pattern (conventionally referred to as consequent) specify new assertions to be placed into working memory (e.g., add to the short/long term fact sets). Thus, the rule-based system may be characterized as a deduction system. Oftentimes, in rule-based systems, the "if" pattern may be mapped into a set of external objects/procedures in order to acquire information. Such a system is referred to as an "active situated" rule-based system. In addition, the "then" patterns may specify actions by attaching a conclusion with a specific object/procedure. Such a rule-based system is referred to as a "reaction" system. An active situated reaction rule-based system utilizing both the active situated and reaction designs, is the most popular rule-based system design and is the basis of most commercial rule based systems.

Many rule based systems support backward and forward chaining. Forward chaining is the process of moving from the "if" patterns to the "then" patterns, using the "if" patterns to identify appropriate situations for the deduction of a new assertion or fact or the execution of an action. In a forward chaining system, if the antecedent (i.e., if pattern) of a rule is satisfied, the rule is triggered. Whenever a triggered rule produces a new fact/assertion, and subsequently performs an action, it is "fired." In a deduction system, all triggered rules are generally fired. However, in a reaction system, when more than one rule is triggered at the same time and many possible actions may be possible, the need for conflict resolution is obvious to identify which actions/action should be executed. Conversely, backward chaining is the process whereby a hypothesis is formed and the antecedent-consequent rules are utilized to work backward toward the assertions or facts that support the hypothesis.

The decision on which chaining method to use to solve a problem or, whether a combination of both forward and backward chaining is to be used to solve a problem, depends on the nature of the problem. Forward chaining runs more efficiently if the following conditions are satisfied: a) all the facts are available and all possible conclusions from the facts are needed; and, b) the number of ways to reach a particular desired conclusion is large, but the number of conclusions that are likely derived from the facts is small. Backward chaining is appropriate if the following conditions are satisfied: a) if facts have not be gathered, and only one of many possible conclusions (such as a query to see if a particular conclusion is true) is required; and, b) if the facts may likely lead to a large number of conclusions, but the paths to reach the required conclusion is small.

The typical rule-based system has a relatively static set of rules while the collection of facts ((knowledge base) changes continuously with time. However, in most rule-based systems and applications, the collection of facts is also relatively static from one rule operation cycle to the next. Empirically, although new facts arrive and old ones are removed continuously, the percentage of facts that change per unit time is usually relatively small. For this reason, the obvious blind search oriented approach implemented for the rules-based system shell is very inefficient in performance as it consumes a large amount of computation because the entire ruleset has to be cycled whenever a new fact is added or deleted from the knowledge base. This blind search approach implementation has a computational complexity equal to:

([number of rules*number of facts in the fact base]**(average number of tests per rule antecedent)])

which increases exponentially with the average number of tests per rule antecedent. Since only a small amount of facts is changed, most of the tests (in the antecedents) made on each iteration will have the same results as the previous ones. This observation has become the basis of an algorithm, known as the RETE algorithm, as described in "Rete: A Fast Algorithm for the Many Pattern/Many Object Pattern Match Problem", Charles L. Forgy, Artificial Intelligence 19 (1982), 17–37, the contents and disclosure of which is incorporated herein. This algorithm is based on the incremental matching of rule antecedents and has become the basis of a whole generation of efficient rules-based systems, e.g., OPS5, ART and CLIPS.

The main idea of the RETE algorithm is to save the state of the bindings at the end of a given iteration cycle and, in the next cycle, generating only a list of the changes to be incorporated to the binding set as a function of the changes that have affected the binding set. The computational complexity of rule based system based on the RETE algorithm now becomes linear and equal to:

((number of rules*number of facts in the fact base*average number of tests per rule antecedent))

and is a substantial improvement over the blind search oriented implementation.

Currently, rule based systems have been widely used in a variety of applications that range from systems that encapsulate business rules into a traditional software application at a specific point of interest, e.g., the part that consists of the business logic and data, to systems that comprise of only rules (executable rules). The main advantage of using a rule-based system in an application is the clear and clean separation of data and business logic, which allows the creation, modification, and maintenance of rules independent of the underlying implementation mechanism. Another advantage of rule-based system is the use of rules (in the form of "if-then-else" syntax) which are much closer to natural language than what the current programming languages (such as Java or C++) can offer. Typical rule-based applications include personalization, marketing, contracts, negotiation, policy specifications, product specification, etc.

A major growing requirement and trend in e-business and network-centric computing is inter-operability, including the use of rule-based systems that are part of heterogeneous applications. For example, one application is a supplier who imports the requirement of a customer, and conducts the negotiation of contract between multiple parties. The sharing and merging of rules for e-business automation involves rules with different formats and will inevitably produce conflicts among rules. An important issue in rule systems is thus conflict handling, in the following sense: Two rules within the same ruleset (e.g., program, agent, knowledge base, database) may lead to incompatible, i.e., mutually exclusive, conclusions. For example, rule 143 classifies incoming message 1014 as having a very high degree of urgency, while rule 231 classifies message 1014 as having medium degree of urgency. Therefore, a system to handle conflicts is an important part of the updating, editing of existing rules as well as rule-sharing and merging. The lack of a systematic way to resolve conflict underlies the historical difficulties in specifying large (e.g., over 100) sets of rules.

It would be highly desirable to provide for a computing system implementing a rule-base knowledge system a conflict handling mechanism, e.g., for handling conflicts during the merging of imported business rules from either updating as in a rule editor, or from a heterogeneous application, e.g., remotely over the Internet. When merging an imported ruleset into a previously present ruleset, it would be desirable to assimilate them, in the sense of forming a new integrated (merged) ruleset.

While there is extensive prior art in the area of conflict handling in rules and rule-based inferencing, and on non-monotonic reasoning involving rules or database systems whose semantics are essentially equivalent to rules, the prior art has focused on conflict handling and merging within a single rule base (a.k.a. knowledge base or data base) in a single rule-based system associated with a single application, although that application may import rules from other applications that use that same rule-based system, e.g., database systems that merge updates and views (in database systems, views and queries and facts are often semantically equivalent to special cases of rules in the sense of logic program knowledge representation) or although that application may have previously created its rule base in part or all by translating rule language formats in addition to importing rules from other applications that use other rule-based systems (e.g., cf. the approach of the DARPA Knowledge Sharing Effort using the Knowledge Interchange Format).

SUMMARY OF THE INVENTION

It is an object of the present invention to provide for a rule-base knowledge system a conflict handling and assimilator mechanism for enabling the exchange or merger of rules with different format and, resolving conflicts among the merged rules.

It is a further object of the present invention to provide for a flexible assimilator service that allows for the exchange or merger of rulesets (e.g., business policies) with different formats in a distributed environment such as the World-Wide-Web or Internet.

It is another object of the present invention to provide for a flexible assimilator service that allows for the exchange or merger of rulesets (e.g., business policies) with different originating formats in a distributed environment such as the World-Wide-Web or Internet, and further enables the resulting merged rules to be translated to any other formats other than the originating ones.

It is another object of the present invention to provide for a flexible assimilator service that allows for the exchange or merger of rulesets (e.g., business policies) with different originating formats in a distributed environment such as the World-Wide-Web or Internet, and further enables the resulting merged rules to be translated to any "rule-engine" neutral format thus enabling the ruleset to be used in any available rule engine which fits the application.

According to the invention, there is provided a system and method for merging two or more rulesets provided in rule-based systems associated with applications executing at different locations, each ruleset comprising rules in potential conflict with each other.

The method includes steps of: communicating rulesets to be merged over a distributed network to an assimilator service device for receiving each ruleset; providing a merge policy to said assimilator device; assimilating the rulesets to produce a new merged ruleset comprising logic required for resolving potential conflicts among rules in accordance with the merge policy; and communicating the new merged ruleset to one of the applications from which the incoming rulesets originated. Advantageously, the new merged ruleset may be translated into a common core representation capable of being implemented in any logic program rule engine provided in a rule-based application at any location.

Advantageously, such a system and method of the invention is applicable for e-business and network-centric computing applications for personalization, marketing, contracts, negotiation, policy specifications, product specification, etc. that make use of rule-based systems. Further, the present invention has applicability to rule-based business processes for e-commerce: both business-to-business (B2B), e.g., to integrate supply chains, and business-to-customer (B2C), and furthers the goal of developing technology that is highly reusable and easy to integrate with a broad spectrum of networked applications, such as in agent-building systems and inter-agent communications.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENTS

Figure 1:
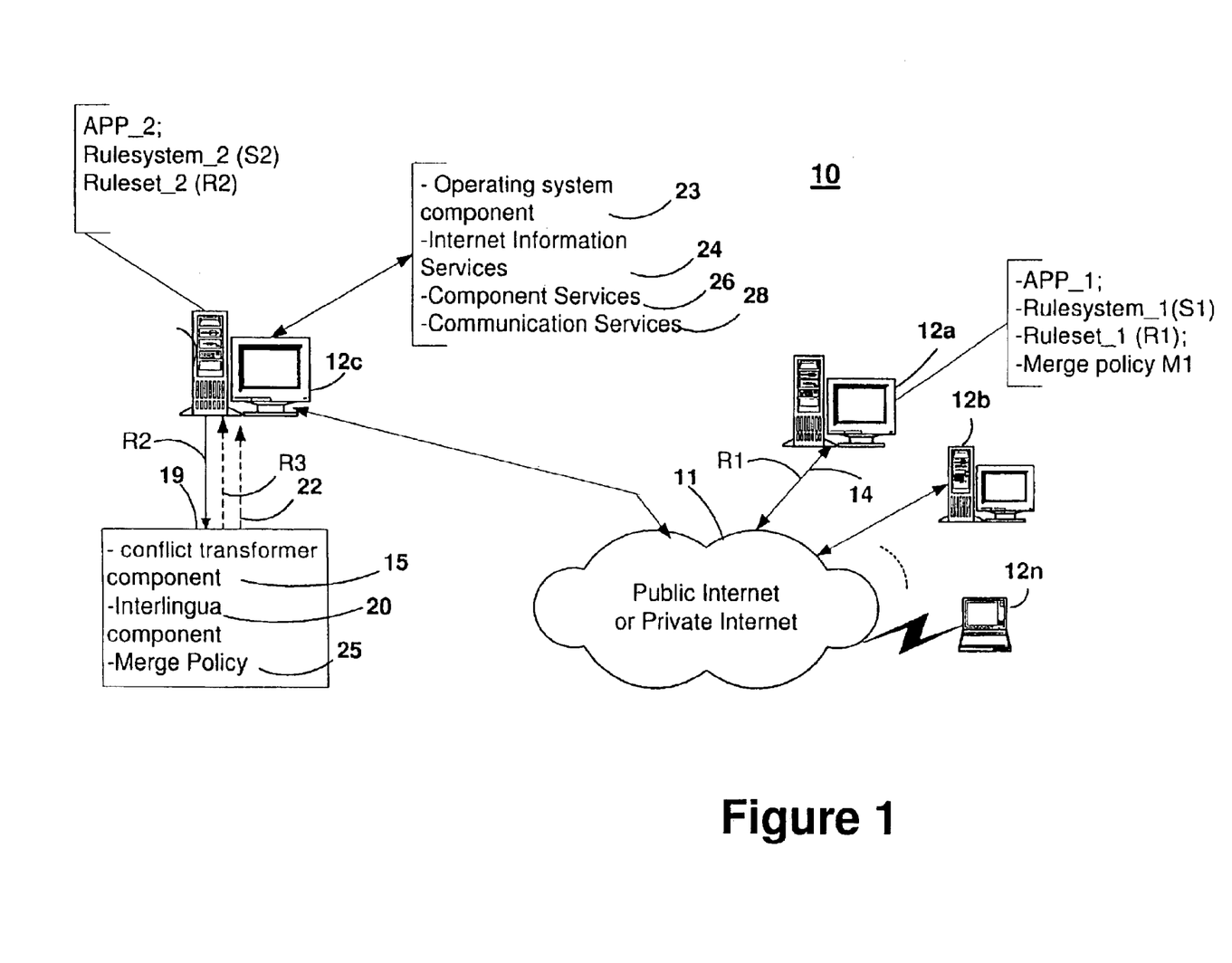
FIG. 1 is a diagram illustrating the implementation of the conflict handling and assimilator service for rule-based knowledge systems and applications in a distributed environment.

The present invention is a flexible conflict handling and assimilator service for rule-based knowledge systems and applications. FIG. 1 is a diagram illustrating a preferred embodiment of the invention that comprises a conflict handling and assimilator service 19 enabling entities 12a, 12b, . . . , 12n to merge or exchange rulesets (e.g., business policies) in a distributed networked environment 10 such as the World-Wide-Web, Internet or Intranet 11, regardless of the actual format of the rulesets. That is, the conflict handling and assimilator service 19 for rule-based knowledge systems includes computing devices such as personal computers (PCs) or, more powerful enterprise server devices 12a, 12b, . . . , 12n running applications, e.g., business applications App__1, App__2, etc. As will be described in further detail herein, there is considered two given rule systems S1 and S2 with S1 being part of a larger application App__1, for example, and S2 part of a larger application App__2. It is understood that, according to the invention, rule systems S1 and S2 may be different, or the same. Likewise, applications App__1 and App__2 may be different, or the same. Rule system S1 has a current ruleset R1, for example, that is to merge with a ruleset R2 which is imported from S2. As an example, ruleset R2 may contain update information, for example, for the ruleset R1. When imported into the conflict handling and assimilator service 19 over a secure communications link 14, for example, a ruleset may be merged with another ruleset in accordance with a specific merge policy. For example, when merging ruleset R1 originated from entity 12a, and ruleset R2 located at device 12c, the service 19 implemented at device 12c may permit S1 and/or App__1 to specify a merge policy M1 which defines the rules and conflict resolution prioritization schemes utilized by the system for enabling the merging of the rule sets. It should be understood however, that a merge policy may originate from a third party entity. As will be explained in greater detail hereinbelow, the service 19 that enables entities to merge or exchange rulesets includes software components such as a conflict transformer 15, an Interlingua, and a merge policy 25 which cooperatively interact to generate a new ruleset R3, e.g., which is the result of merging R2 into R1, according to the merge policy M1. In addition, the result 22 of the conflict analysis is sent back to the application. According to the invention, the assimilator service 19 may be a separate arms-length service performed by an application (not shown) which is distinct from App__1 and App__2, or, it may be tightly integrated into application App__1 (or App__2). The assimilator service 19 may be performed remotely, e.g., over Internet or wide-area-network, or locally, e.g., in the same process or machine 12c, as shown in FIG. 1. If S1 and S2 are different kinds of rule systems, the rule interlingua service may be used to translate between them, as part of preparing to merge R1 and R2. When S2 and A2 coincide with S1 and A1, the assimilator service 10 may be used as part of a rule editor component.

As further depicted in FIG. 1, and shown only with respect to a single server device 12c for illustrative purposes, each of the computing devices/servers 12a, . . . , 12n may employ hardware, software and other database storage components including, but not limited to: 1) domain controllers including: an Operating System (OS) component 23, e.g., such as Microsoft Windows® 2000 (PC or NT (network-based)) system to provide the basic software platform upon which all other software mechanisms operate; and, 2) application server components including: Internet Information Services (IIS) 24 which is a mechanism enabling files on a computer to be read by remote computers and particularly, may be used to house, secure and present a web site to either the Internet or an intranet; Component Services 26 which function as a repository of custom Dynamic Link Libraries (dll's) that allow custom applications to perform actions in data sources foreign to the application, e.g., enabling a web page to query data on a database; and, Communication Services 28 which include a server application that enables various electronic communications e.g., e-mail or other robust messaging infrastructure. Preferably, the sum of these operating system, component and communication services enables the communication and merging of different rulesets originated from different locations in the distributed environment.

Figure 2:
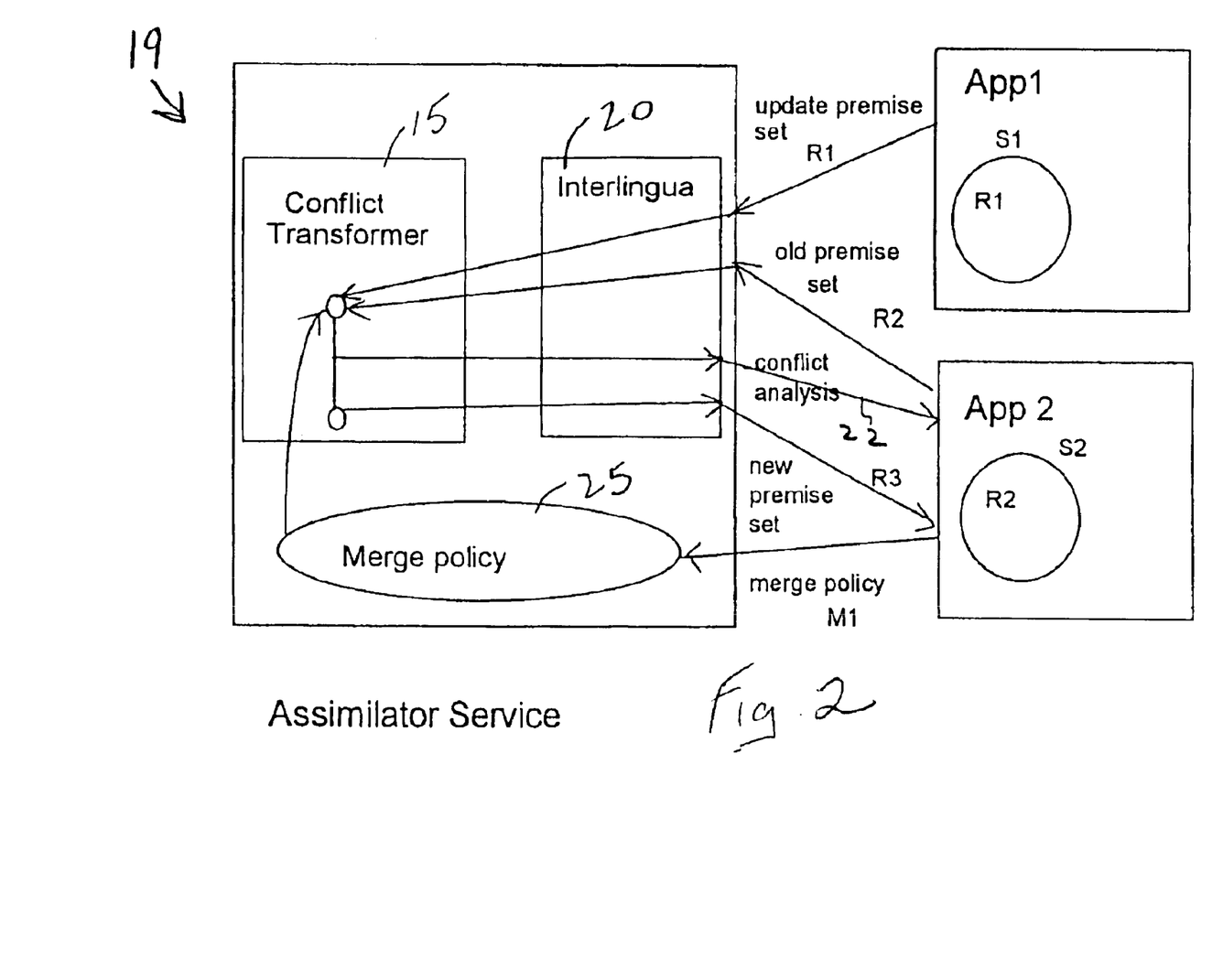
FIG. 2 is a diagram depicting the interaction between the various components underlying the conflict handling and assimilator service for rule-based knowledge systems and applications according to the invention.

FIG. 2 is a diagram depicting the high-level interaction between the various components underlying the conflict handling and assimilator service 19 for rule-based knowledge systems and applications according to the invention. As shown in FIG. 2, the assimilator service and conflict handling system 19 comprises two subsystems: the Conflict Transformer subsystem 15 and the Interlingua subsystem 20. Generally, the role of the Interlingua 20 is to accept rulesets with different formats and transform the rulesets into a common core representation called Courteous Logic Program ("CLP") which is the format accepted by the Conflict Transformer. The CLP particularly, is an extension of Prolog that includes provisions for conflict handling and procedural attachment and particularly, provides methods to resolve conflicts that may arise in authoring (specifying), updating and merging. CLP's are particularly useful as rule-based intelligent agents that enhance "information-flow" applications. A more detailed description of CLP's and their applications may be found in IBM Research Report RC 20836 entitled *Courteous Logic Programs: Prioritized Conflict Handling for Rules*, Dec. 30, 1997, revised from May 8, 1997 by Benjamin N. Grosof (accessible via http://www.research.ibm.com/rules), and, the reference entitled IBM CommonRules Version 2.1 Technical Overview, 2000 by Hoi Chan and Benjamin Grosof which is available from http://www.Alphaworks.ibm.com, the whole contents and disclosure of which are incorporated by reference as if fully set forth herein. The Interlingua 20 additionally transforms any resulting merged, exchanged, or modified ruleset from CLP into the original format so as to return it to the application from which the ruleset originates.

Generally, the role of the Conflict Transformer 15 is to analyze the input rulesets for conflicts and resolve conflicts among rules from one or more rulesets based on the user-defined merge policy. The merge policy expressed in CLP includes syntax and semantics to express conflict resolution via the priority specification and mutual exclusion statements. A more detailed explanation on the operation and mechanism of the Conflict Transformer may be found in the references entitled *Compiling Prioritized Default Rules Into Ordinary Logic Programs* by Benjamin Grosof, IBM Research Report RC21472, May 7, 1999, and available from http://www.research.ibm.com/rules/paps/rc21472.pdf; and 2) *A Courteous Compiler From Generalized Courteous Logic Programs to Ordinary Logic Programs* by Benjamin Grosof, Supplementary Update follow-on to IBM Research rc21472, Jul. 2, 1999, and available from http://www.research.ibm.com/rules/paps/gclp report1.pdf, the whole contents and disclosure of each, and references cited therein, are incorporated by reference as if fully set forth herein.

More specifically, the purpose of the Interlingua component 20 is to enable communication of rules between a heterogeneous variety of commercially useful rule languages. The interlingua is an interchange-format rule representation and the Interlingua package implements not only this interchange-format, but also several sample translation services to/from a variety of rule languages, i.e., bi-directionally between the interlingua 20 and these rule languages. Courteous Logic Programs (CLP's), embodied in the form of Java objects, i.e., "CLPobj's", are used as the common interlingua knowledge representation within the implementation with all translations performed into and out of this representation. At a surface level, an XML encoding of CLP's is also provided as a string format for communication between rule-using applications A1 and A2.

As described in above referenced IBM CommonRules Version 2.1 Technical Overview, 2000 by Hoi Chan and Benjamin Grosof incorporated by reference herein, a CLP may comprise plain pure Prolog ruleset as Prolog syntax essentially is a form of CLP. The canonical string format for CLP in CommonRules is in XML. This is a neutral Web interchange format for communication of CLP's (i.e., rulesets) between heterogeneous rule systems—each of which has its own CLP (rule) syntax. An ASCII file format may exist for CLP's, that supports the full expressive generality of CLP syntax. Called "CLPfile", this is similar in syntax to many existing rule systems, e.g., Prolog's and Knowledge Interchange Format (KIF). CLPfile format is more concise for human text editing than the XML format. In operation, the Interlingua package 20 implements a "translate" function for translating a ruleset from a file format into CLPobj, and a "converting" function for translating a CLPobj into a file format. The overall design approach of the top-level interlingua translator service 20, (hereinafter "Translator") is to use a CLPobj as a common intermediary representation. Using conventional techniques, an input file in a source rule language is parsed in to build a CLPobj, then this CLPobj is converted to an output file in the target rule language, which may be a format different than the originating ones. Thus, the resulting merged rules may be translated to any "rule-engine" neutral format so that the ruleset may be used in any available rule engine which fits the application.

Preferably, the following set of rule language formats are currently supported as the available choices for either or target rule language: 1) XML file format for CLP; 2) CLPfile format for CLP (in ASCII); 3) KIF, i.e., ANSI Knowledge Interchange Format (in ASCII); 4) XSB, a particular ordinary-logic-program (OLP) system (in ASCII) which is a leading academic OLP system and does backward inferencing similar to Prolog; and, 5) Smodels, an ordinary-logic-program system (in ASCII) that is capable of forward inferencing.

Figure 3:
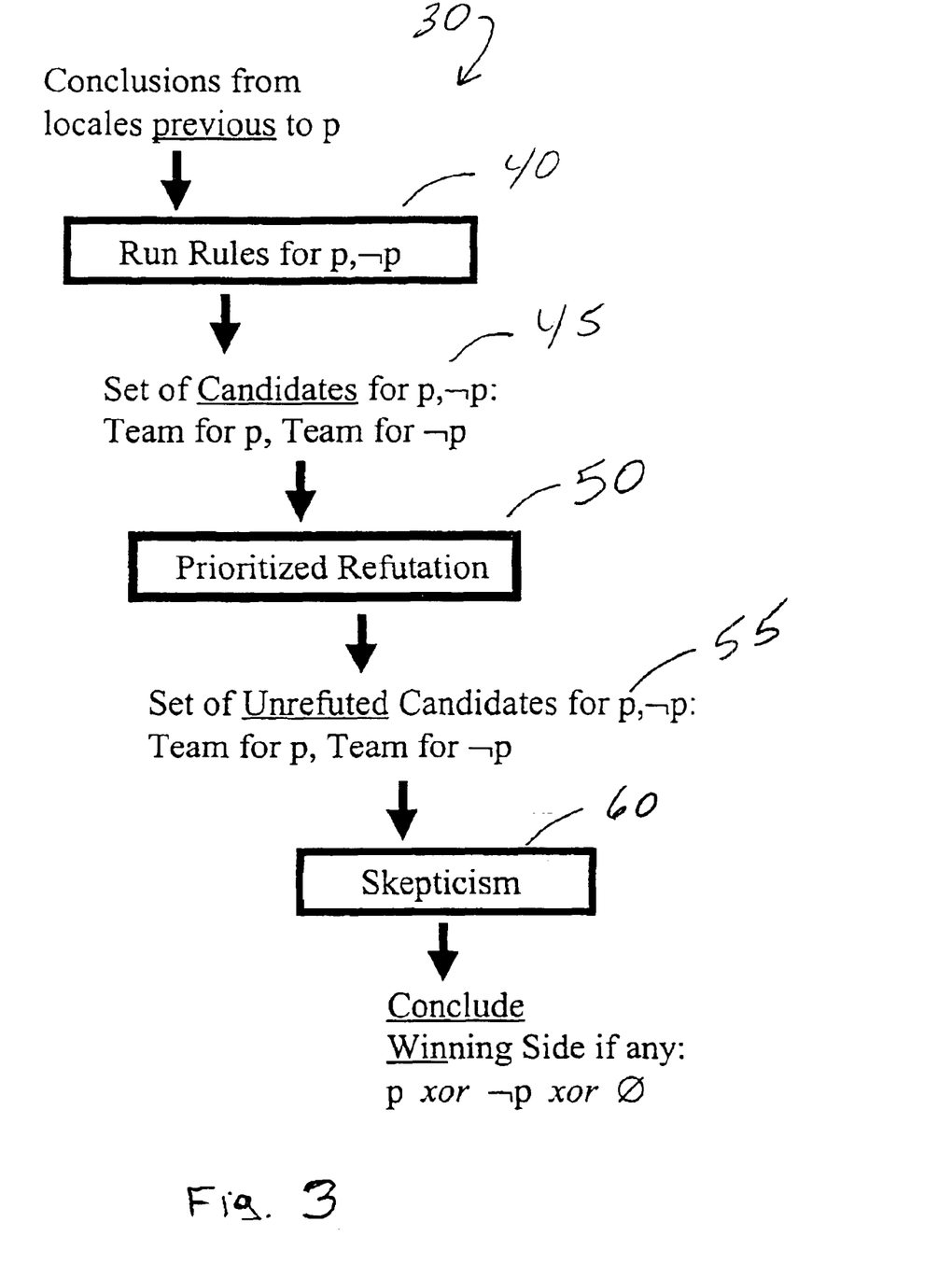
FIG. 3 is a logic flow diagram depicting the logic implemented in the conflict transformer 15.

More specifically, the Conflict Transformer 15 receives the input ruleset(s) and a facts premise (i.e., rules without conditions attached), analyze the rules for conflicts, introduces new rules and predicates based on the specifications of the merge policy 25 by using a logic based algorithm as will be hereinafter described with respect to FIG. 3. The resulting ruleset R3 which is expressed as an Ordinary Logic Program ("OLP") will include all the necessary logic to resolve all potential conflicts and, which may directly be applied to any logic program rule engine. Thus, the purpose of the CLP Transformer is to transform prioritized rules into rules without priority e.g., ordinary logic programs.

The heart of the Conflict Resolution component 15 lies in the merge policy 25. As mentioned, the merge policy represents priorities and/or mutual-exclusions. The merge policy may, however, represent these priorities in a high level and indirect manner using attributes of the input rulesets R1 and R2 (these attributes may, in turn, come from S1, S2, App_1, and/or App_2. For example, the merge policy may specify that more recently time-stamped rules shall have higher priority than less recently time stamped rules. Alternately, the merge policy may specify that the relative priority of rules is based on relative authority level of the originating source application of those rules. More precisely, the expressive features of the merge policy are: 1) mutual-exclusion statements, and 2) partially-ordered priorities between rules. A mutual exclusion statement specifies that two belief expressions of the rule language are to be enforced as mutually exclusive. This, in effect, defines the scope of conflict. Thus, in the above-described example wherein a rule 143 classifies incoming message 1014 as having a very high degree of urgency, while rule 231 classifies message 1014 as having medium degree of urgency, then a mutual exclusion statement may specify that the same message (e.g., Message 1014) must be classified as very high degree of urgency and as medium degree of urgency. Higher priority of one rule (e.g., Rule 231) over another rule (e.g., Rule 143) specifies that in case of conflict, the higher priority rule's conclusion shall prevail over the lower priority rule's conclusion (e.g., Message 1014 shall be concluded to have medium degree of urgency rather than very high degree of urgency). Enforcement of mutual exclusion is desirable; it enables deep semantic guarantees including consistency, e.g., with respect to the intended meaning of "degree of urgency". Partially ordered priorities are relatively natural to specify. For example, they represent well preference for more recently acquired rules (e.g., as in database updating or legislation), or for rules from more authoritative sources (e.g., as in bureaucratic workflow, security authorization, or legal jurisdiction), or for rules that are more specific (e.g., as in object-oriented inheritance or special-case exceptions). S1 and S2 may or may not contain the expressive features to specify priorities and/or mutual exclusions.

As will be described in greater detail hereinbelow, and with further view of FIG. 2, the output 22 of the conflict transformer includes results which comprise various conclusions resulting from application of the merge policy 25 including: 1) no conclusions, e.g., empty sets that result from the merge policy not generating any conclusions; 2) unrefuted or definite conclusions; 3) skeptical conclusions (conflicts remain); and, 4) a combination of definite and skeptical conclusions. This output 22 is input back to the application, e.g., Application 2, which decides what to do with the resulting analysis set. Further shown output from the conflict transformer is an updated premise set R3 which comprises the merged ruleset. Thus, two businesses may merge rule-sets R1 and R2 to determine how compatible their policies are. Thus, a merge policy is generated based on common sense and the rulesets are merged to generate a conflict analysis and a new set of facts to determine what rules are refuted, and what rules are in conflict, etc. This application will enable the businesses to either resolve the conflicts, ignore them, change a rule to solve a conflict or, even facilitate a decision to refuse to do business together.

More particularly, with respect to the merge policy CLPs 25, the following mechanisms are implemented to identify and resolve conflicts among rules:

a) Mutual exclusion constraints (called mutex's), each between a pair of classical literals, are permitted, the mutual exclusion between "p" and "not p" is a special case of such a mutex. Consistency with respect to such mutex's is then enforced.

b) Recursive dependency among the predicates is permitted with restriction.

c) Prioritization predicate is unrestricted.

d) Reasoning about the prioritization ordering is permitted. I.e., inferring conclusions about the "overrides" predicate, derived from rules possibly via chaining, is permitted.

For example, a CLP rule may be represented generally as follows:

a(?X,?Y)<-b(?X,?Y . . . ) AND c(?X,?Y . . . ) with a, b, c representing predicates or facts, ?X, ?Y representing variables, and with the right hand side of the rule "a(?X, ?Y)" representing the conclusion or consequent and, the left hand side of the rule "b(?X,?Y)" representing the antecedent.

An "Unconditional" mutex may be represented generally as follows:

MUTEXHEAD<-L1 AND L2. (Li is a classical literal) with L1 and L2 being mutually exclusive, with, at most, one of the two literals L1 and L2 may be included.

A "Conditional" mutex may be represented generally as follows:

MUTEXHEAD<-L1 and L2 GIVEN G1 AND G2 with Gn meaning L1 and L2 are mutually exclusive, and, at most, one of the two literals L1 and L2 is concluded IF the conclusions specified after the "GIVEN" keyword are true. The conditional statement after "GIVEN" specifies the conditions at which L1 and L2 are mutually exclusive.

EXAMPLE 1

Assuming a patient cannot take aspirin and thyomine together. If the patient is female who is pregnant, then the resulting rulesets and the merge policy (Mutex) that excludes the prescription of both aspirin and thyomine (drug names are hypothetical) is provided in the pseudocode version as follows:

```
/* RuleSet 1, treatment of minor pain */
<ruleset1_1>prescription(aspirin, ?Patient)<-symptom
    (minorpain, ?Patient).
/* RuleSet 2, treatment of ulcer */
<ruleset2_1>prescription(thyomine, ?Patient)<-symptom
    (ulcer, ?Patient).
/* Merge policy */
MUTEX_HEAD<-prescription(aspirin, ?Patient) AND
prescription(thyomine, ?Patient) MUTEX_GIVEN
    pregnant(?Patient).
```

A Prioritization predicate or "overrides" used to specify prioritization may be represented generally as follows:

Overrides (ij) which specify that the rule with label "i" has (strictly) higher priority than the rule with label "j."

Conditional overrides used to specify prioritization may be represented generally as follows:

overrides (ij)<-L1(ij) AND L2(ij) which specifies that rule "i" has higher priority than rule "j" if the conditions on the right hand side of the overrides rule (Antecedent) are met. Intuitively, prioritization is used as part of handling conflicts that arise when two rules (whose bodies are satisfied) have mutually exclusive heads, prioritization influences which rule's head will be inferred as a conclusion.

A logic flow diagram of the logic algorithm 30 implemented by the conflict transformer device 15 is now described with respect to FIG. 2. As shown in FIG. 2, to begin at step 40, there is a step of obtaining sets of conclusions from locales previous to p, e.g., all rules mentioning a predicate "p" in the head that is the focus of the conflict handling. That is, potentially conflicting rules that exist with a conclusion of one rule (p), e.g., p(?X,?Y)<-a (?X,?Y . . . ) and a conclusion negation of the rule "not p" (~p), e.g., ~p(?X,?Y)<-b(?X,?Y . . . ) (a conflicting conclusion). It is these kinds of rules that the assimilator attempts to transform into a set of rules that will enable conflict resolution. Thus, at step 45, from locales, i.e., conclusions that may have conflicts, a determination is made as to the set of candidates, i.e., conclusions that may comprise potential conflicting rules, e.g., p(1), p(2), p(3), . . . , and ~p(1), ~p(2), ~p(3), . . . , etc. After identifying these candidates, they are grouped or teamed into two sets of teams, e.g., a team having rule conclusion (p) and a team having rule conclusion (~p). Next, at step 50, there is performed the step referred to as Prioritized Refutation which is a step for importing the merge policy and locally apply the conflict resolution mechanisms described therein to each of the candidates, i.e., apply the logic overrides, priorities, etc., if provided in the specified merge policy, and determine if any candidates may be defeated. Thus, for example, if one rule has a higher priority than a second rule, then that rule will be eliminated (defeated)—i.e., one side survives. At this point, the remaining conclusions constitute a set of unrefuted candidates 55, i.e., rules that are no longer challenged. However, another set of rules may remain that are still in conflict as there was no conflict resolution logic (override) instruction in the applied merge policy, i.e., two sides survived. That is, there still may remain some rules having conclusions that are considered "skeptical", i.e., may be challenged. To identify these skeptical conclusions, there is performed the step 60 in FIG. 2, referred to as skepticism, to determine if there is a potential winner in the set of skeptical conclusions (candidates). This step involves performing an exclusive OR (XOR) operation between the rules, e.g., (p) and (~p), which will result in a number of possible outcomes. For instance, if the XOR of (p) and (~p) results in an empty set, then this indicates the existence of either of (p) and (~p), but not both (p) and (~p).

Therefore it may be concluded that a winner exists, whether it is (p) and (~p). The existence of both (p) and (~p) indicates skepticism, since it is logically impossible to conclude that (p) is true while the negation of (p), i.e., (~p) is also true. Thus, both candidates (p) and (~p) will be excluded from the winner candidate set, i.e. the ruleset will not give any information and there will be no conclusion. Thus, at the output of the conflict transformer process, there are either: 1) an empty set representing the set of no winners—the ruleset will not provide any information; 2) a set including sole winners, which ruleset comprises definite conclusions that are genuine and will not be challenged; and, 3) a set of challengeable conclusions, i.e., there are equally valid negations for the rule at hand. A more detailed description of the foregoing algorithm, may be found in above-mentioned IBM Research Report RC 20836 entitled *Courteous Logic Programs: Prioritized Conflict Handling for Rules*, Dec. 30, 1997, revised from May 8, 1997 by Benjamin N. Grosof.

EXAMPLE 2

Given first and second rulesets as follows:

```
/* ruleset 1 */
<jun>cneg important(?Msg)<-from(?Msg, ?X) AND
    retailer(?X).
/* ruleset 2 */
<del>important(?Msg)<-from(?Msg, ?X) AND
    awaitingDeliveryFrom(karen, ?X).
<fav>important(?Msg)<-from(?Msg, faveCo).
```

It is apparent that the <jun> rule in ruleset 1 is in conflict with <del> and <fav> rules in ruleset 2. E.g., <jun> rule indicates msg is NOT important by the cneg operator which contradicts with <del> and <fav> rules in ruleset 2. Thus, to remedy this conflict, the following prioritization fact may be added to the merge policy in the form of an exception override to the junk rule as follows:

/* merge policy */ overrides(del, jun).
overrides(fav, jun).

It should be understood that, in addition to mutex's and override statements, the merge policy further includes logic, i.e., to decide when to apply overrides and the mutexes. Further, when a merge policy is applied to a set of facts or a premise set, they may be refuted or rendered skeptical.

EXAMPLE 3

The following example illustrates an example merging of two rulesets given in accordance with a supplied merge policy after identifying the potential conflicts in the rules. This example relates to an example store return policy wherein there is implemented a rule A) enabling a product return for full credit less 10% deposit, for any reason, within 30 days; and a rule b) enabling a return for full credit, if purchase is defective, within 1 year.

Rule A) may be represented as follows:
<unconditionalGuarantee> refund(?Return,percent90)<-return(?Return) and delay(?Return,?D) and lessThanOrEqual(?D,days30),
while Rule B) may be represented as follows:
<defectiveGuarantee> refund(?Return,percent100)<-return(?Return) and reason(?Return,defective) and delay(?Return,?D) and lessThanOrEqual(?D,years1).

Obviously there is a potential scenario where both of these rules apply. So a merge policy is provided so that defective guarantees have a higher priority than unconditional guarantees. This is stated as follows:
overrides(defectiveGuarantee,unconditionalGuarantee)
.Additionally, there is provided a MUTEX HEAD representing that a 90% refund and a 100% refund cannot exist together for this example. That is:
MUTEX_HEAD<-refund(?Refund,percent90) and refund(?Refund,percent100).

A general form for the Mutex_Head may be stated as follows: MUTEX_HEAD<-refund(?refund,?X) and refund(?refund,?Y) MUTEX_GIVEN notEquals(?X,?Y), which generally represents that if both refund amounts ?X, ?Y are different they can not both be applicable. That is, unless these are both equal, the defective guarantee will always override.

Example possible premise sets for these example rules include the following:
/* should be 90% */
return(toaster02).
delay(toaster02,days12).
lessThanOrEqual(days12,days30).
/* should be 100% */
return(blender08).
delay(blender08,days44).
lessThanOrEqual(days44,years1).
reason(blender08,defective).

Conflict handling will be applied in the present scenario given these facts:
return(radio04).
delay(radio04,days22).
lessThanOrEqual(days22,years1).
lessThanOrEqual(days22,days30).
reason(radio04,defective).

In this last premise set, conflict handling will be 100%.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for merging two rulesets provided in rule-based systems associated with originating applications executing at different locations, each ruleset comprising rules implementing a policy in potential conflict with each other, and each ruleset being in a different rule format, said method comprising:
   a) communicating said rulesets to be merged over a distributed network to an assimilator service device for receiving each said ruleset;
   b) providing a merge policy to said assimilator device, said merge policy comprising a set of specifications including syntax and semantics for expressing conflict resolution as partially-ordered priorities and/or mutual-exclusion constraints;
   c) translating said rulesets into a common core representation capable of being implemented in any logic program rule engine provided in a rule-based application at any location;
   d) assimilating said rulesets to produce a new merged ruleset comprising logic required for resolving potential conflicts among rules in accordance with said merge policy, where said new merged ruleset is in a common core representation capable of being implemented in any logic program rule engine provided in a rule-based application at any location;
   e) translating said new merged ruleset into one of said originating application's said rule format; and
   f) communicating said translated new merged ruleset over said distributed network to the one of said originating applications.

2. The method according to claim 1, wherein said assimilator device is employed to merge rulesets in two or more rule formats from two or more originating applications and communicate the translated new merged ruleset to one of said originating applications.

3. The method according to claim 1, wherein said assimilator device is employed for updating rules included in a first ruleset imported from a rules-editor device.

4. The method according to claim 2, wherein said assimilating step includes applying one or more logic mechanisms in said merge policy for identifying conflicts and resolving conflicts among said rules.

5. The method according to claim 2, wherein a logic mechanism includes a priority specification for expressing conflict resolution.

6. The method according to claim 2, wherein a logic mechanism includes mutual exclusion constraints.

7. The method according to claim 2, wherein said core representation includes a courteous logic program.

8. The method according to claim 2, wherein said distributed network is the Internet.

9. An assimilator system for merging two or more rulesets provided in rule-based systems associated with originating applications executing at different locations, each ruleset having rules implementing a policy in potential conflict with each other, said system comprising:
   a communications network enabling the transmission and receipt of rulesets to be merged between said different locations;
   a translator mechanism for translating each said ruleset from its rule format into a common core representation capable of being implemented in any logic program rule engine provided in a rule-based application at any location and for translating from said common core representation into each said originating application's rule format;

a conflict transformer mechanism for receiving each said ruleset and assimilating said rulesets to produce a new merged ruleset in accordance with a merge policy, said merge policy comprising specification of statements including syntax and semantics for expression conflict resolution as a set of partially-ordered priorities and/or mutual-exclusion constraints that comprise logic required for resolving potential conflicts among rules; and, device for translating said new merged ruleset into a common core representation capable of being implemented in any logic program rule engine provided in a rule-based application at any location.

10. The assimilator system as claimed in claim 9, wherein said new merged ruleset is produced in said common core representation, said transforming device converting said new merged ruleset into one of said originating formats.

11. The assimilator system as claimed in claim 9, wherein said merge policy includes one or more logic mechanisms for identifying and resolving conflicts among said rules.

12. The assimilator system as claimed in claim 11, wherein a logic mechanism includes a priority specification for expressing conflict resolution.

13. The assimilator system as claimed in claim 12, wherein a logic mechanism includes mutual exclusion constraints for expressing conflict resolution.

14. The assimilator system as claimed in claim 9, wherein said communications network includes the Internet.

15. A program storage device readable by machine, tangibly embodying a program of instructions executable by the machine to perform method steps for merging two rulesets provided in rule-based systems associated with originating applications executing at different locations, each ruleset comprising rules implementing a policy in potential conflict with each other, and each ruleset being in a different rule format, said method comprising:

a) communicating said rulesets to be merged over a distributed network to an assimilator service device for receiving each said ruleset;

b) providing a merge policy to said assimilator device, said merge policy comprising a set of specifications including syntax and semantics for expressing conflict resolution as partially-ordered priorities and/or mutual-exclusion constraints;

c) translating said rulesets into a common core representation capable of being implemented in any logic program rule engine provided in a rule-based application at any location;

d) assimilating said rulesets to produce a new merged ruleset comprising logic required for resolving potential conflicts among rules in accordance with said merge policy, where said new merged ruleset is in a common core representation capable of being implemented in any logic program rule engine provided in a rule-based application at any location;

e) translating said new merged ruleset into one of said originating application's rule format; and f) communicating said translated new merged ruleset over said distributed network to the one of originating applications.

16. The program storage device readable by machine as claimed in claim 15, wherein said assimilator device is employed for updating rules included in a first ruleset imported from a rules-editor device.

17. The program storage device readable by machine as claimed in claim 15, wherein after said assimilating step, a step of transforming said new merged ruleset from said common core representation back to an originating format.

18. The program storage device readable by machine as claimed in 15, wherein said assimilating step includes applying one or more logic mechanisms in said merge policy for identifying conflicts and resolving conflicts among said rules.

* * * * *

UNITED STATES PATENT AND TRADEMARK OFFICE
CERTIFICATE OF CORRECTION

PATENT NO. : 6,910,028 B2 Page 1 of 1
APPLICATION NO. : 09/916943
DATED : June 21, 2005
INVENTOR(S) : Hoi Yeung Chan et al.

It is certified that error appears in the above-identified patent and that said Letters Patent is hereby corrected as shown below:

On the title page item (57), line 9, ABSTRACT
"The rulesets are translated into a common core representation capable of being implemented in any logic program rule engine provided in a rule-based application at any location."

should read

-- The rulesets are translated into a common representation capable of being implemented in any logic program rule engine provided in a rule-based application at any location. --

Column 2, Line 32 - 33:
"([average number of tests rule antecedent])"

should read

-- [average number of tests per rule antecedent]) --

Column 2, Line 55 – 56:
"(number of rules* number of facts in the fact base*average number of tests per rule antecedent))"

should read

-- (number of rules*number of facts in the fact base*average number of tests per rule antecedent) --

Signed and Sealed this

Twenty-sixth Day of December, 2006

JON W. DUDAS
*Director of the United States Patent and Trademark Office*